United States Patent
Slothouber et al.

(10) Patent No.: US 8,849,612 B2
(45) Date of Patent: Sep. 30, 2014

(54) SYSTEM AND METHOD OF SUBSTITUTING PARAMETER SETS IN SELF-CONTAINED MINI-APPLICATIONS

(75) Inventors: Louis P. Slothouber, Leesburg, VA (US); Aaron Ye, Ashburn, VA (US); Jeffrey W. Johnston, Charlottesville, VA (US)

(73) Assignee: Fourthwall Media, Inc., Dulles, VA (US)

( * ) Notice: Subject to any disclaimer, the term of this patent is extended or adjusted under 35 U.S.C. 154(b) by 619 days.

(21) Appl. No.: 12/878,671

(22) Filed: Sep. 9, 2010

(65) Prior Publication Data

US 2011/0067003 A1 Mar. 17, 2011

Related U.S. Application Data

(60) Provisional application No. 61/242,136, filed on Sep. 14, 2009.

(51) Int. Cl.
*G06F 11/30* (2006.01)
*G06F 9/44* (2006.01)

(52) U.S. Cl.
CPC ........................................ *G06F 8/38* (2013.01)
USPC .......................................... 702/182; 717/126

(58) Field of Classification Search
CPC ..... G06F 3/048; G06F 3/0481; G06F 9/4443; G06F 9/445; G06F 9/44505; G06F 8/34; G06F 8/38; H04L 67/34; H04L 41/22
USPC ............................ 717/101–178; 715/200–867
See application file for complete search history.

(56) References Cited

U.S. PATENT DOCUMENTS

| | | | | |
|---|---|---|---|---|
| 5,710,901 A | * | 1/1998 | Stodghill et al. | 715/710 |
| 6,405,364 B1 | * | 6/2002 | Bowman-Amuah | 717/101 |
| 7,546,543 B2 | * | 6/2009 | Louch et al. | 715/762 |
| 7,856,619 B2 | * | 12/2010 | He et al. | 717/109 |
| 7,873,908 B1 | * | 1/2011 | Varanasi et al. | 715/763 |
| 7,937,723 B2 | * | 5/2011 | Weissmueller et al. | 725/22 |
| 8,302,020 B2 | * | 10/2012 | Louch et al. | 715/764 |
| 2002/0080200 A1 | | 6/2002 | Wong et al. | |
| 2004/0039993 A1 | * | 2/2004 | Kougiouris et al. | 715/513 |
| 2004/0153992 A1 | * | 8/2004 | Molina-Moreno et al. | 717/105 |

(Continued)

OTHER PUBLICATIONS

Fast: a framework for automating statistics-based testing—Huey-Der Chu, John E. Dobson and Chiang Liu—Centre for Software Reliability, Department of Computing Science, University of Newcastle upon Tyne, NE1 7RU, UK—Department of Information Management, National Defense Management College, Chungho 23500, Taiwan—1997.*

(Continued)

*Primary Examiner* — Lewis A Bullock, Jr.
*Assistant Examiner* — Francisco Aponte
(74) *Attorney, Agent, or Firm* — Hunton & Williams LLP (57) ABSTRACT

Disclosed are systems and methods of building a default set of parameters into a software application by defining a widget template having associated parameter schema and then instantiating a widget by substituting a new set of application parameters for the built-in defaults such that the new parameters meet the same constraints defined for the default parameters. Aspects of the invention also include testing the original application containing the default parameters, along with the parameter substitution process itself, using a Statistical Software Testing Methodology (SSTM) to ensure the application meets a pre-determined level of quality.

13 Claims, 5 Drawing Sheets

(56) References Cited

U.S. PATENT DOCUMENTS

| | | | | |
|---|---|---|---|---|
| 2004/0205583 | A1* | 10/2004 | Jones et al. | 715/513 |
| 2004/0205637 | A1* | 10/2004 | Witt | 715/526 |
| 2005/0177837 | A1 | 8/2005 | Mensah et al. | |
| 2005/0193368 | A1* | 9/2005 | Becker et al. | 717/106 |
| 2007/0079291 | A1* | 4/2007 | Roth | 717/124 |
| 2008/0155402 | A1* | 6/2008 | Jean et al. | 715/700 |
| 2008/0229188 | A1* | 9/2008 | Kostoulas et al. | 715/234 |
| 2008/0235602 | A1* | 9/2008 | Strauss et al. | 715/762 |
| 2008/0250044 | A1* | 10/2008 | Adams | 707/101 |
| 2009/0007054 | A1* | 1/2009 | Voss | 717/101 |
| 2009/0083697 | A1 | 3/2009 | Zhang et al. | |
| 2009/0089688 | A1* | 4/2009 | Zhao | 715/762 |
| 2009/0089838 | A1* | 4/2009 | Pino et al. | 725/40 |
| 2009/0199230 | A1 | 8/2009 | Kumar et al. | |
| 2009/0217250 | A1* | 8/2009 | Grechanik et al. | 717/136 |
| 2009/0217302 | A1* | 8/2009 | Grechanik et al. | 719/320 |
| 2009/0249186 | A1* | 10/2009 | Fetzer | 715/234 |
| 2010/0005407 | A1* | 1/2010 | Liu et al. | 715/764 |
| 2010/0162274 | A1* | 6/2010 | Gangadharappa et al. | 719/328 |
| 2010/0306639 | A1* | 12/2010 | Burr et al. | 715/227 |
| 2011/0169835 | A1* | 7/2011 | Cardno et al. | 345/440 |
| 2011/0261049 | A1* | 10/2011 | Cardno et al. | 345/419 |

OTHER PUBLICATIONS

Design for Intuitive Use—Testing Image Schema Theory for User Interface Design—Jörn Hurtienne, Engineering Design and Methodology and Center of Human-Machine-Systems, TU Berlin; and Luciënne Blessing, Engineering Design and Methodology, TU Berlin—International Conference on Engineering Design, ICED'07 Aug. 28-31, 2007.*

Fast: a framework for automating statistics-based testing—Huey-Der Chu, John E. Dobson—Centre for Software Reliability, Department of Computing Science, University of Newcastle upon Tyne and I-Chiang Liu, Department of Information Management, National Defense Management College, Chungho 23500, Taiwan—Software Quality Journal 6, (1997) 13-16.*

C. K. Cho, Ph.D., "Statistical Methods Applied to Software Quality Control," Computa, Inc.; 17; pp. 427-464; 1992.

Huey-Der Chu, et al., "FAST: A Framework for Automating Statistics-based Testing," Software Quality Journal; University of Newcastle and National Defense Management College; pp. 1-33; 1997.

PCT International Search Report for PCT/US10/48594 mailed Nov. 9, 2010; 3 pages.

PCT Written Opinion of the International Searching Authority for PCT/US10/48594 mailed Nov. 9, 2010; 6 pages.

John E. Dobson et al., "FAST: A Framework for Automating Statistics—based Testing," Software Quality Journal 6; 1997; 29 pages; found at: http://citeseerx.ist.psu.edu/viewdoc/summary?doi=10.1.1.148.7215], section 2.1, 2.2; p. 6 to 7.

PCT International Preliminary Report for PCT/US2010/048594 mailed Mar. 29, 2012; 8 pages.

* cited by examiner

SYSTEM AND METHOD OF SUBSTITUTING PARAMETER SETS IN SELF-CONTAINED MINI-APPLICATIONS

CROSS-REFERENCE TO RELATED APPLICATIONS

The present application claims priority to U.S. Provisional Patent Application No. 61/242,136, filed Sep. 14, 2009, which is hereby incorporated by reference in its entirety. The present application is also related to U.S. patent application Ser. No. 11/532,286 entitled "Self-Contained Mini-Applications Systems and Methods for Digital Television" to Slothouber et al., filed on Sep. 15, 2005, the disclosure of which is hereby incorporated by reference in its entirety.

FIELD OF THE INVENTION

The invention relates generally to the field of interactive computing devices such as set-top boxes, and specifically to the use of computing applications to interact with such devices.

BACKGROUND OF THE INVENTION

In constrained computing environments, such as set-top boxes, self-contained mini-applications provide effective means for supporting user interaction. These self-contained mini-applications are sometimes referred to as "widgets." Widgets have been implemented in a variety of different ways including as compiled source code targeted to run in particular end-user hardware and software environments. Widgets have also been implemented as source code that is compiled into bytecode and then run on a platform-specific virtual machine which makes appropriate use of the platform's middleware, operating system, and other resources. Widgets have also been implemented as Enhanced TV Binary Interchange Format 1.0 (EBIF) applications.

To speed deployment, reduce costs, and improve reliability, application template customization approaches can be used for widget implementation. These approaches are generally oriented toward reducing the need to create and test new code by reusing components and parameterizing common functions. Skinning, which generally refers to the ability to personalize application Graphic User Interfaces (GUIs) by separating presentation details from the underlying data, has deployment, cost, and reliability benefits. Skinning accomplishes this by providing multiple platform-specific GUIs while leveraging some common components. Well known examples of skinning include those implemented in most instant messaging clients, media players, and web browsers like Mozilla and Opera. In the interactive TV (iTV) domain, use of templates and skinning are disclosed in U.S. Pat. Nos. 7,231,630 and 7,430,718.

Any approach that generates customized source code, even code based on common, reused source modules, can cause problems when not properly created and tested to function with end-user environments. In cable TV systems, for example, a given widget will likely be deployed simultaneously to a large number of heterogeneous digital cable systems across the country. A single misspelling or excessively long text string introduced during template customization can produce serious errors. An extraneous byte in a popular application's measurement response can cause a system's return-path network to fail. To provide acceptable reliability, a conventional application template customization approach may require testing for every application variation created from a template. At least one full operator system trial may also be required to uncover any bandwidth or timing induced problems. This approach would be prohibitively expensive and rule out rapid sales-customization-deployment-response cycles. It would therefore be desirable to have a way to reduce defects in customized templates.

SUMMARY OF THE INVENTION

Aspects of some embodiments of the invention may comprise systems and methods of building a default set of parameters into an application and subsequently substituting a new set of application parameters for the built-in defaults such that the new parameters meet the same constraints defined for the original default parameters. Aspects of the invention also include testing the original application containing the default parameters, along with the parameter substitution process itself, using a Statistical Software Testing Methodology (SSTM) to ensure the application meets a pre-determined level of quality.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements. The drawings are exemplary only and should not be construed as limiting the invention.

DETAILED DESCRIPTION OF THE INVENTION

As used herein, the term "widget" may refer to self-contained, mini-applications that support user interaction. The term "widget template" may describe the application containing the default parameter set. The term "widget instantiation" may describe the process of substituting a default set of parameters with another parameter set. A "widget" may be the application that results from the "widget instantiation process."

In some embodiments of the present invention, the widgets may be implemented as applications compliant with the EBIF specification running on set-top boxes over a cable TV broadband network. Widget instantiation may also be appropriate for use with other application software standards and practices, Customer Premises Equipment (CPE) devices, and networks.

In certain preferred embodiments of the invention, widget instantiation may be utilized in processes for the creation of certified widget templates and schemas and the use of these templates and schemas to create and deploy customized widgets.

The process of creating and certifying widget templates and schemas is typically done by software engineers and/or software quality assurance personnel (a.k.a. "widget template developers"). The second process of using these templates and schemas to create and deploy customized widgets may generally be accomplished by widget application developers (a.k.a. "widget developers"). The goal of these processes is to avoid the time-consuming and costly testing process that is conventionally required for each customized application built from a template. Instead, a statistical testing process may be applied to the process of instantiating widgets from widget templates to certify that the probability of a defect in any widget produced by the system is below a previously determined threshold. In some embodiments, this testing process may be completely automatable. In some embodiments, human quality assurance may be injected into the system to judge defects in aesthetics or to assure widget quality in any other way.

While it is possible to provide template-based application development with ad-hoc testing of templates and the generated customized applications, this testing typically does not explore the entire template parameter space, nor does it typically provide any formal correlation between the number of testing trials performed and the expected defect rate. In short, ad-hoc testing typically does not know what to test, nor how much testing is sufficient.

Figure 1:
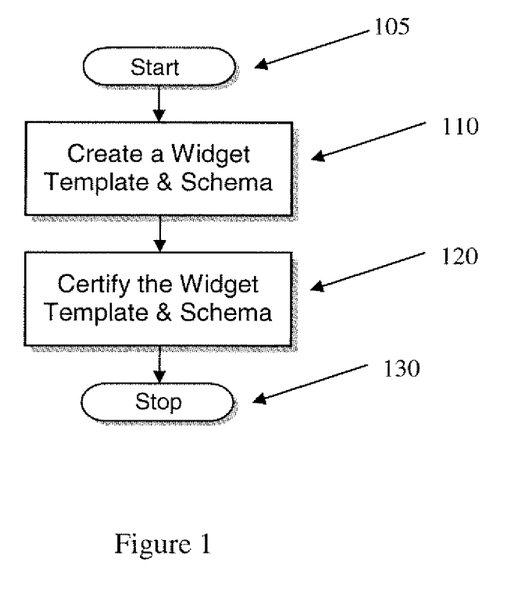
FIG. 1 is a schematic diagram depicting the creation of a certified application template containing a default parameter set in conjunction with an associated schema.

As shown in FIG. 1, the creation of a certified widget template and schema may comprise the steps of starting a process in step 105, creating a widget template and schema in step 110, certifying the widget template and schema in step 120, and stopping the process in step 130.

Figure 2:
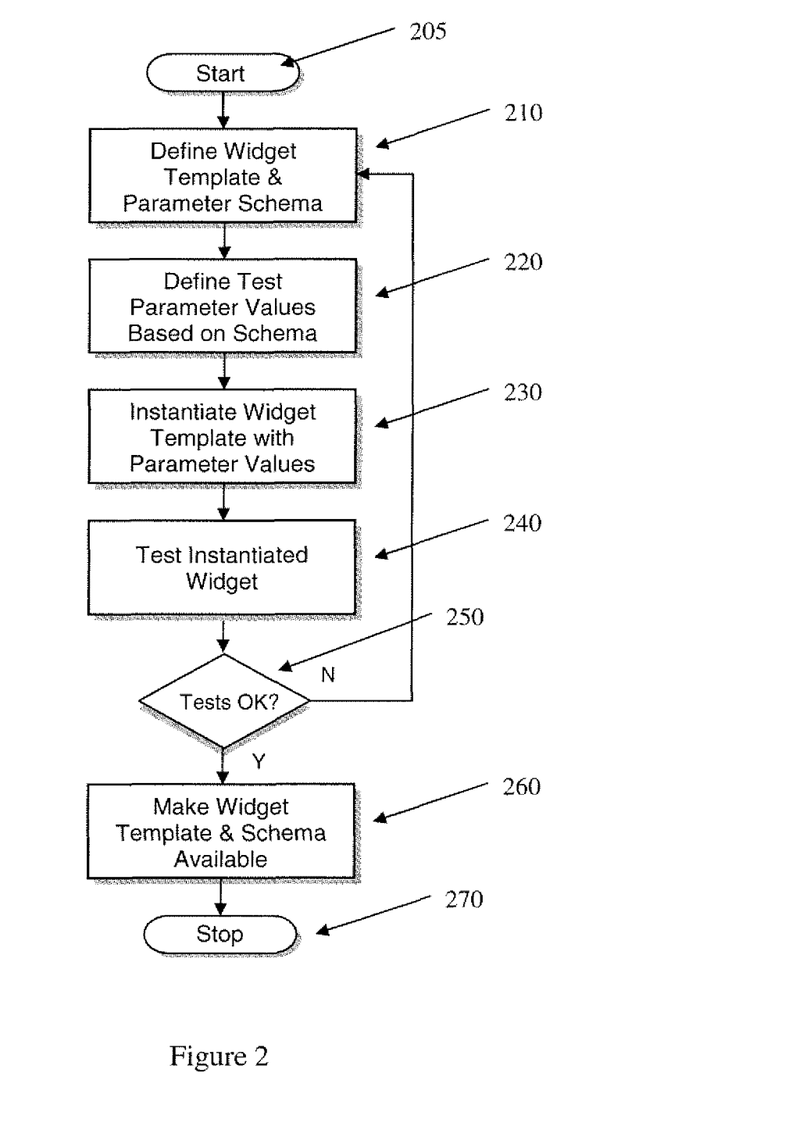
FIG. 2 is a schematic diagram depicting the creation of a widget template and associated schema.

As shown in FIG. 2, a process for the creation of a widget template and schema may be started in step 205. In step 210, a widget template and associated parameter schema are defined. A widget template may be an application containing parameters whose values can be customized to provide a particular set of widget features. In some embodiments of the invention, widget templates embody interactive features. In some embodiments of the invention, widget templates embody non-interactive features. For example, an interactive widget template might enable a TV viewer to request information from an advertiser (an RFI Widget) wherein parameters are provided for indicating the advertiser and product names, relevant images, descriptive text, and a means to enter customer contact information. A non-interactive widget template might, for example, provide captions or advertising messages for presentation over video running on a particular TV channel. Various types of widgets, such as those provided by FourthWall Media Ad Widgets® and TV Widgets®, may be suitable for widget templates. In some embodiments, these widgets may be suitable for widget templates when parameters that enable a given template to be customized for multiple uses are capable of being identified.

The term "parameter schema" in step 210 may be a data structure or program associated with a widget template. A parameter schema may provide constraints for controlling what values are legal for each customizable parameter in the template. Such constraints may include, but are not limited to: required variable type for each parameter; minimum and maximum lengths of strings; maximum size of images; valid characters for strings; formatting rules/patterns for strings; minimum and maximum values for numeric parameters; identification of illegal values for strings and numeric parameters; rules relating one parameter value to another; restrictions on image data and other blobs checkable by parsing the data against a specification (e.g., assuring valid PNGs of certain types); checking strings against controlled vocabularies/dictionaries; and other similar constraints.

Figure 3:
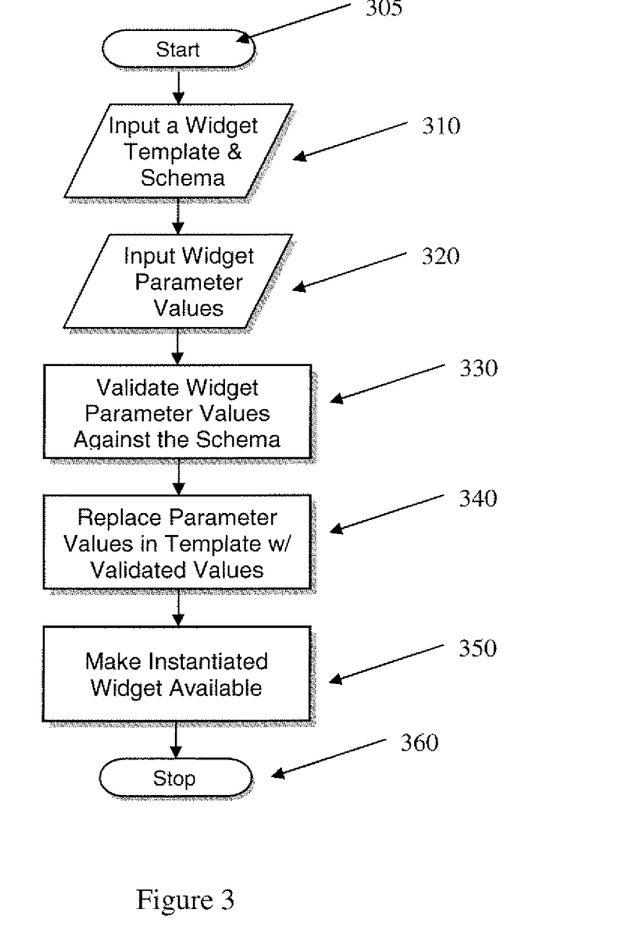
FIG. 3 is a schematic diagram depicting the widget instantiation process of substituting a default set of parameters with another parameter set.
Figure 4:
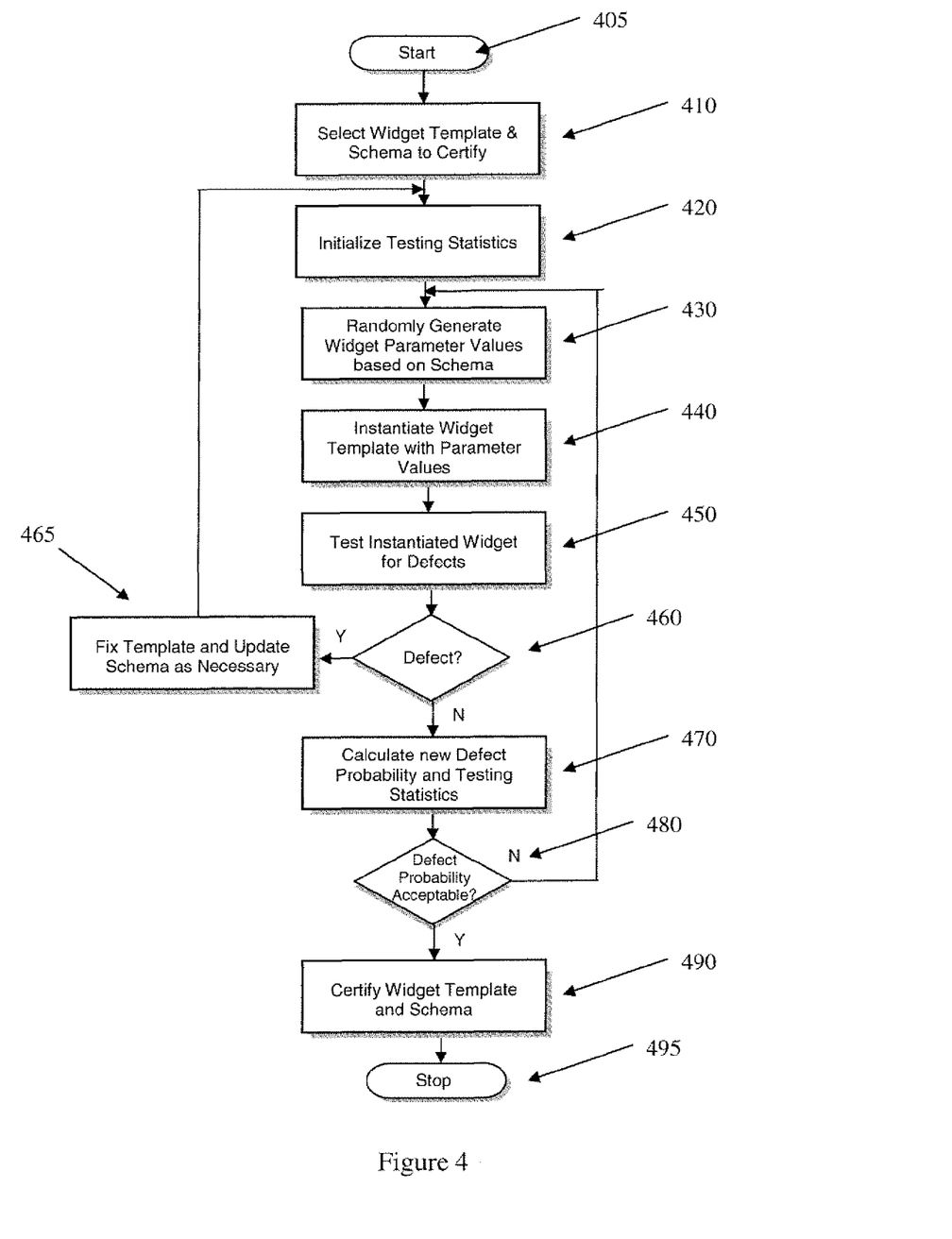
FIG. 4 is a schematic diagram depicting the certification of applications containing a customized parameter set and schemas.

The parameter schema in step 210 may also be used in verifying legal parameter values during widget instantiation in step 330, and in automatically generating test cases during the widget template certification process in step 430. These parameter schema may be implemented as an XML Schema, enhanced XML Schema, a SIAD ("Symbolic Input Attribute Decomposition") tree, or using other similar approaches. In an embodiment, widget templates may be designed to have parameters that are static literal values with no dependencies on one another, e.g., independent text, images, bloom filters, Boolean values, etc. Thus, in one preferred embodiment, a simple XML Schema suffices to constrain legal values for the processes defined herein. The subject methods are not, however, restricted to having only semantic constraints such as those typically provided by a standard XML Schema. More advanced constraints (e.g., contextual/syntactic) may be supported. In addition, the parameter schema defined in step 210 may, in some embodiments, include information or further constraints about the likelihood of values to be used in practice by widget developers. In some embodiments, this information may be used to provide test cases which may better reflect actual defect rate and mean time between failure (MTBF) estimates during the certification process.

In some preferred embodiments, widget templates and parameter schemas may be defined in step 210 so that a default parameter (i.e., placeholder) values may be readily replaced during widget instantiation. In some embodiments, such placeholders may be implemented by defining parameter slots sized appropriately for the largest data values allowable for each parameter and/or by employing other knowledge about compilation mechanisms and the layout of applications in memory. In these embodiments, the resulting source code may then be compiled into a binary data structure wherein placeholder values can be quickly and reliably replaced without requiring recompiling the source code during a subsequent widget instantiation step. In these embodiments, it may be important that both the default and substituted parameter values conform to identical constraints specified by the associated schema.

In a preferred embodiment, widget templates may be developed using the EBIF standard to provide Enhanced TV (ETV) functionality on CPE devices such as set-top boxes connected to a broadband cable TV network. Available EBIF tools, validators, user agents, and other components may be used. Other software development environments, procedures, and tools may also be applicable to widget template and schema definition, which will be apparent to a person of ordinary skill in the art. Any programming language may be used to support widget template development and any widget development suite suitably modified to support widget instantiation.

Steps 220 through 240 in FIG. 2 depict testing steps preferably executed during the widget template and schema creation process. In step 220, test parameter values based on the associated schema may be defined. In some embodiments, such values may be oriented toward typical values, boundary values, and/or degenerative case values. In step 230, the widget template may be instantiated using the parameter values defined in step 220. Exemplary details of step 230 are further described in FIG. 3. In step 240, the instantiated widget may be tested with the values inserted in step 230. If a test fails as indicated in step 250, then the process may return to step 210 and the widget template and associated schema may be redefined as necessary. If all critical tests pass in step 250, then the widget template and schema may be considered complete and the process may continue to step 260. In step 260, the widget template and schema may be made available for the certification process described in FIG. 4. The current process may be stopped in step 270.

The widget template and schema creation process of FIG. 2 corresponds generally to source code development, compilation into binaries, and unit testing by the developer until ready for more rigorous testing by software quality assurance personnel. In some embodiments of the invention, the required application functionalities are balanced with the widget size and expected deployment requirements in step 210. For example, while it is possible to define a single widget template to encompass all functionality for a class of applications, it may be preferable to develop several distinct templates for a given class, each optimized for specific layout options (e.g., vertical, horizontal, etc.).

As shown in FIG. 3, an exemplary process of instantiating a widget template with parameter values comprises the steps of starting the process in step 305, inputting a widget template and corresponding widget parameter schema in step 310, inputting widget parameter values in step 320, validating the parameter values against the schema in step 330, replacing placeholder parameter values in the widget template with the specified parameter values in step 340, making the resulting widget available in step 350, and stopping the process in step 360.

The process depicted in FIG. 3 may be utilized, for example, in step 230, step 440, or step 530. To initialize the widget instantiation process, two sets of inputs are provided in FIG. 3: the widget template to be instantiated and its associated schema in step 310, and parameter values to be used to customize the template in step 320. The widget template and schema in step 310 may be provided by the parent process as files, data streams, or other means known to software practitioners. The widget parameter values in step 320 may be provided after being generated by a parent process, e.g., What You See Is What You Get (WYSIWYG) widget editor tool, test case generator, text editor, etc.

Step 330 validates the widget parameter values against the provided schema. In step 330, the constraints or other rules defined in the schema are used to check each of the input parameter values from step 320. If all the values comply with the constraints defined in the schema, then the process may continue onto step 340. In some embodiments, if one or more parameter values do not comply with the schema, then the process may abort and an error handling process may be invoked.

In step 340, the validated input parameter values may be used to replace the corresponding default (placeholder) parameter values in the widget template which were created during widget template and schema definition, such as those created in step 210. Replacement of the parameter values in step 340 may occur via direct replacement in a memory structure, using a call interface, or any other suitable means. The replacement of the parameter values in step 340 may be capable of making the overall widget instantiation process more efficient than other methods that require the recompilation of code.

In step 350, the instantiated widget may be made available to the parent process for use (e.g., widget template creation, template certification, template customization, etc.).

As shown in FIG. 4, the process for certifying a widget template and schema may be started in step 405. In step 410, a widget template and associated schema generated during the widget template and schema creation process depicted in FIG. 2 may be selected for certification.

In some embodiments, testing statistics may be initialized in step 420. Step 420 may include specifying a target value for the acceptable defective rate ($\theta_a$) and initializing other variables appropriate for controlling and tracking the tests in step 420.

A set of parameter values may be generated based on the associated schema in step 430. This set of parameter values may include a randomly generated value for each required parameter. These values may be randomly generated from the set of all possible parameter values that are legal per the schema, or randomly generated using a subset distribution of values reflecting those likely to be used by widget developers in practice. This latter distribution may be reflected in the associated schema or by additional constraints.

In step 440, a widget is instantiated using the parameter values generated in step 430. The instantiation step may be accomplished in the same manner as the depiction in FIG. 3. Given the nature of the instantiation process (i.e., parameter value replacement versus recompilation), step 440 may be executed very quickly and allow thousands of test cases to be run in a reasonable amount of time.

In step 450, the resulting widget may be tested for defects. If a defect is found in step 460 (Defect?=Y), then a determination may be made in step 465 to fix the widget template and update the associated schema as necessary and processing returns to step 420. Such a fix may involve modifying the widget template source code and recompiling it into a widget template binary that includes replaceable parameter values. Alternatively, if a defect is found in step 460, testing may continue in step 470 as additional tests are generated and run. This exemplary embodiment may avoid the need to make changes (and possibly introduce other defects) when the overall defect rate may be acceptable in step 480. For example, if the first few tests fail in step 460, but the next thousand tests pass in step 470, the widget template may be certifiable as the defect probability and testing statistics from step 470 and the defect probability rate in 480 are below the accepted defect rate necessary to certify the widget template and schema in step 490. Step 450 may be automated by, for example, using SIAD trees, SOAD ("Symbolic Output Attribute Decomposition") trees, or similar techniques capable of adequately assessing the pass/fail status of the tests. Given SSTM ("Statistical Software Testing Methodology") automatic test case generation, test cases need not be stored and rerun after the application fixes defects. Rather, new cases can be automatically generated as needed. Storing and reusing previously-generated cases, especially cases that caused failures, may be desirable for regression testing, auditing, and analysis purposes.

If the current test case passes in step 460 (Defect?=N), then new defect probability and test statistics may be calculated as indicated by step 470. If the defect probability is not acceptable, processing may return to step 430 and a new set of widget parameter values may be randomly generated. If the defect probability is deemed acceptable in step 480, then the widget template and schema may be certified in step 490 and the certification process may stops in step 495.

The configuration of the certification environment may reflect the key variables relevant to successful deployment of the widgets that result from instantiation. This allows widget developers and those deploying the widgets to have high confidence in the reliability and success of widgets verified in this environment. Such configurations may also take into account key network components, characteristics of target CPE devices (including actual or representative mixes of components), and other considerations relevant to deployment environments in order to account for pertinent interactions and potential fault modes. For example, the certification environment may include components that simulate a large number of CPE devices connected to the network and their behaviors in the face of device reboots and network failures when upstream out-of-band traffic exceeds channel capacity.

The certification process depicted in FIG. 4 may utilize a Statistical Software Testing Methodology (SSTM), which may be based on Cho, C. K., "Statistical Methods Applied to Software Quality Control," in *Software Quality Assurance, 2nd Edition*, Shulmeyer, G. and J. McManus, eds., Van Nostrand Reinhold, New York, 1992 and as extended by Chu, H. D., Dobson, J. E., and Liu, I. C., "FAST: A Framework for Automating Statistics-based Testing," *Software Quality Journal*, Springer, 1997, wherein the defect ratio for generated widgets can be driven as low as desired (e.g., less than 1 in 10,000) using automatically-generated test cases. Assessment of test results can also be automated. Time invested in SSTM testing at template-creation time enables instantiated widgets to be created and deployed with little or no additional testing, providing for rapid widget deployment and minimal operational costs.

SSTM is a statistical testing methodology that can be employed to ensure that the population defective rate, $\theta$, over P, the population of widget applications that may be instantiated from valid widget customization parameters, is below an acceptable defective rate $\theta_a$. This is possible given that constraints on widget customization parameters may be defined by a suitable schema and that a validating parser is run to assure widget customization parameters satisfy all constraints. Such a schema may be defined by an XML Schema document (XSD), a SIAD Tree, an extended XML Schema document, or similar constructs. If an XSD is used, then the validating parser may be a standard XML parser.

Sampling (random sampling is assumed) from P, we can estimate $\theta$, defined by $$\theta = \frac{D}{N},$$

where D is the number of defective widget applications in P, and N is the number of possible widget applications in P, using the binomial distribution. The probability function of the binomial distribution is given by:

$$b(x) = \binom{n}{x}\theta^x(1-\theta)^{n-x}$$

This gives the probability of getting x defectives in a sample of n units taken from a population having a defective rate of $\theta$. The mean and variance of the distribution are given by:

$$\mu = n\theta$$

$$\sigma^2 = n\theta(1-\theta)$$

Once the initial sample is taken and inspected, the defective rate $\theta^0$ of the sample may be computed by $\theta^0 = d/n$, where d is the number of defects in the sample.

The defective rate of the population can then be estimated from d. The estimate may be expressed in an interval called the 100c % confidence interval, where $0 \le c \le 1$. An approximate 100c % confidence interval of the population defective rate may be computed by:

$$\left[\theta^0 - t_{n-1,a/2}\frac{\sqrt{\theta^0(1-\theta^0)}}{n}, \theta^0 + t_{n-1,a/2}\frac{\sqrt{\theta^0(1-\theta^0)}}{n}\right]$$

where $t_{n-1,a/2}$ is called the value of the Student t-distribution at n−1 degrees of freedom and a=−c is called a risk factor. By means of explanation, a binomial distribution in statistics can be approximated by a normal distribution. In the normal distribution, there is a value represented by $z_{a/2}$, which is the number of standard normal deviations such that the area to its right under the normal curve is a/2. The value of $t_{n-1,a/2}$ is the same as $z_{a/2}$ if n is large, e.g., n≥30. A Student t-distribution table from which $t_{n-1,a/2}$ can be found when n is small, e.g., n<30, is available in many statistics books.

The accuracy of the estimates may depend on the sample size. In general, the larger the size, the more accurate the estimate. The value of n may be computed by:

$$n = \frac{z^2(1-\theta)}{a^2\theta}$$

where a is the desired accuracy factor such that $|\theta-\theta^0|=a\theta$, and z is the value of $z_{a/2}$.

Since the population defective rate $\theta$ is unknown, the determination of n may take several iterations. The sample defective rate $\theta^0_i$, found at iteration i is used as $\theta$ in computing n at iteration i+1. If $n_{i+1}$ is less than $n_i$, the total number of units in the sample already taken, then the sampling is completed. The final sample defective rate is then used to estimate $\mu$ and $\sigma^2$.

The above discussion about the SSTM process is deterministic. Given a procedure for generating random valid widget customization parameter values, the entire testing process to determine if $\theta < \theta_a$ may be automated, subject to the automation of a widget application testing procedure to identify widget application defects across the relevant target deployment environments (e.g., EBIF user agents). Since the SSTM methodology may test fully instantiated widget applications, not just the widget templates or parameter values used to instantiate them, this methodology validates and verifies the instantiation process and the resulting widgets under the assumption that widget customization parameter values are correctly validated according to the defined parameter schema.

In certain applications, widget customization parameter values may include images. It may or may not be reasonable to expect the widget customization parameter schema to define all image types, or for validating parsers to recognize valid image data. Nevertheless, the WYSIWYG nature of the preferred customized widget creation and deployment process depicted in FIG. 5, and the availability of immediate instantiation and execution of the widget applications on target deployment platforms or emulators within the customization environment, ensure that all image files are valid.

Figure 5:
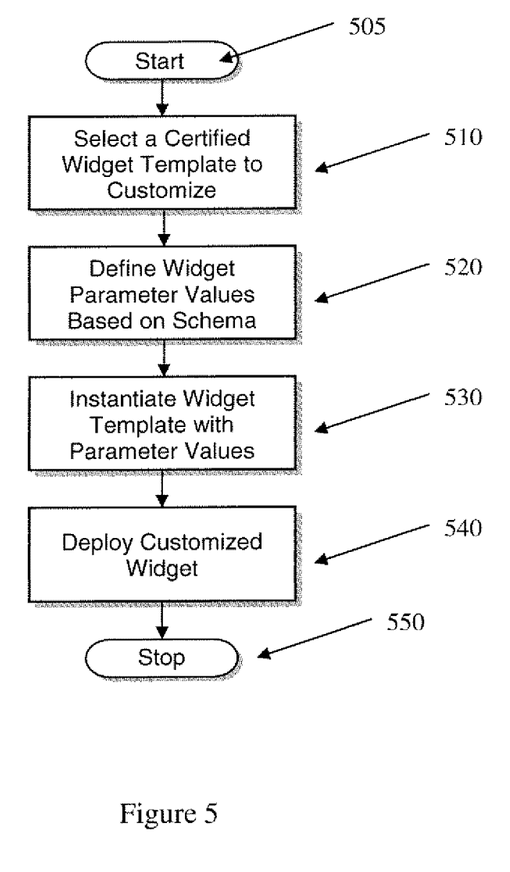
FIG. 5 is a schematic diagram depicting the creation and deployment of applications based on widget templates and associated schema.

As shown in FIG. 5, the process of creating and deploying customized widgets may comprise the steps of starting the process in step 505, selecting a certified widget template to customize in step 510, defining parameter values appropriate to a particular application compliant with the associated schema in step 520, instantiating the widget template using the defined parameter values in step 530, deploying the customized widget in step 540, and stopping the process in step 550.

In step 510, a certified widget template may be selected to be customized. Selection may be accomplished using a WYSIWYG tool that allows searching and browsing through a collection of available certified templates.

In step 520, widget parameter values may be defined based on the schema associated with the selected template. These values may be defined manually using text editing, image management, image editing, and other such tools, or by ad hoc access to assets from a computer file system. Alternatively, parameter values may be defined by linking to and picking values from preexisting data sources such as advertiser databases, ad management systems, customer databases, image databases, video databases, and the like. Associated tools may automatically assure that parameter values are compliant with the corresponding schema as the values are defined or selected. Tools may also be provided to facilitate the proper association and synchronization of widget content with underlying video programming content.

In step 530, the widget template may be instantiated with the parameter values defined in step 520. The instantiation process from FIG. 3 may be used. Widgets may be automatically instantiated and immediately available for inspection using software that emulates the target deployment platforms for review by widget developers.

In step 540, the customized widget may be deployed to customers via multiple system operators (MSOs) or other distributors. One example of a customer is a television viewer. Deployment may involve, but is not limited to, encapsulating a resulting widget file as an EBIF binary in a CoDF wrapper and transmitting it to a cable network's broadcast or ad insertion system for deployment using a data carousel. Alternatively, the process may produce an XML or other file containing the desired parameter values, and send that file separately from the template for instantiation with the proper template nearer the final distribution point. Such parameter files may also be stored and managed distinctly from ready-to-run widgets for reuse, editing, auditing, and other purposes. The process is stopped in step 550.

The rapidity and reliability of widget instantiation depicted in FIG. 5 may allow widget creation and deployment to occur in late-binding, local insertion scenarios. In some embodiments of the invention, widget content may even be inserted in real time during live TV broadcasts.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A computer-implemented method for certifying a widget template having associated schema, comprising:
    selecting the widget template having associated parameter schema for certification;
    specifying a target value for an acceptable defect rate;
    iteratively generating, using a processor, a set of parameter values, the set of parameter values based on the associated parameter schema and varying from iteration to iteration, wherein for each iteration performing the steps:
    (1) an initial sample of (n) units to be tested is chosen,
    (2) parameter values are randomly generated from a set of all valid parameters as defined by the schema for the n units,
    (3) a validating parser is run to assure the parameters satisfy the schema constraints,
    (4) n widgets are instantiated using the widget template and the generated parameter values,
    (5) the n widgets are tested for defects to determine the sample defect rate)($0°$ , wherein the sample defect rate equals the number of defective widgets found divided by n,
    (6) the overall defect rate is estimated by extrapolating from the sample defect rate,
    (7) the sample defect rate is used to calculate a new value of n,
    (8) steps (2)-(7) are repeated until a suitable n is determined and sampling is completed, wherein the sample defect rate)($0°$ found at iteration i is used as the defect rate for computing n at iteration i+1, wherein a suitable n is determined and sample is completed if n at iteration i+1 is less than n at iteration i; and
    terminating the certification process and certifying the widget template if the sample defect rate is within the acceptable defect rate.

2. The computer-implemented method of claim 1, wherein an XML schema, enhanced XML schema, or SIAD tree is used to automatically generate the set of parameter values.

3. The computer-implemented method of claim 1, wherein SOAD trees are used to determine the defect rate.

4. The computer-implemented method of claim 1, wherein the parameter values are randomly generated from a subset of parameter values that are likely to be used in deployed widgets.

5. A computer-implemented method for creating an instantiated widget, comprising:
    receiving a certified widget template having associated parameter schema and default parameter values, wherein the certified widget template results from a process comprising:
    selecting a widget template having associated parameter schema for certification,
    specifying a target value for an acceptable defect rate,
    iteratively generating, using a processor, a set of parameter values, the set of parameter values based on the associated parameter schema and varying from iteration to iteration, wherein for each iteration performing the steps:
    (1) an initial sample of (n) units to be tested is chosen,
    (2) parameter values are randomly generated from a set of all valid parameters as defined by the schema for the n units,
    (3) a validating parser is run to assure the parameters satisfy the schema constraints,
    (4) n widgets are instantiated using the widget template and the generated parameter values,
    (5) the n widgets are tested for defects to determine the sample defect rate($0°$) , wherein the sample defect rate equals the number of defective widgets found divided by n,
    (6) the overall defect rate is estimated by extrapolating from the sample defect rate,
    (7) the sample defect rate is used to calculate a new value of n,
    (8) steps (2)-(7) are repeated until a suitable n is determined and sampling is completed, wherein the sample defect rate)($0°$) found at iteration i is used as the defect rate for computing n at iteration i+1, wherein a suitable n is determined and sample is completed if n at iteration i+1 is less than n at iteration i; and terminating the certification process and certifying the widget template if the sample defect rate is within the acceptable defect rate;

providing alternative parameter values;

validating, using a processor, the alternative parameter values against the associated parameter schema;

replacing the default parameter values with the validated alternative parameter values; and making the instantiated widget available for use.

6. The computer-implemented method of claim 5, wherein the widget template and associated schema are received as files or data streams.

7. The computer-implemented method of claim 5, wherein the default parameter values are generated by a widget editor tool, test case generator, or text editor.

8. The computer-implemented method of claim 5, wherein the associated parameter schema provides semantic and syntactic constraints.

9. The computer-implemented method of claim 5, wherein the parameter schema is an XML schema, enhanced XML schema, or SIAD tree.

10. The computer-implemented method of claim 5, wherein the replacing the default parameter values comprises direct replacement of values in a memory structure.

11. The computer-implemented method of claim 5, wherein the replacing the default parameter values comprises: direct replacement or using a call interface.

12. A system comprising one or more computer processors configured to:

receive a certified widget template having default parameter values, wherein the certified widget template results from a process comprising:

selecting a widget template having associated parameter schema for certification, specifying a target value for an acceptable defect rate, iteratively generating, using a processor, a set of parameter values, the set of parameter values based on the associated parameter schema and varying from iteration to iteration, wherein for each iteration performing the steps:

(1) an initial sample of (n) units to be tested is chosen, (2) parameter values are randomly generated from a set of all valid parameters as defined by the schema for the n units, (3) a validating parser is run to assure the parameters satisfy the schema constraints, (4) n widgets are instantiated using the widget template and the generated parameter values, (5) the n widgets are tested for defects to determine the sample defect rate)(0°), wherein the sample defect rate equals the number of defective widgets found divided by n, (6) the overall defect rate is estimated by extrapolating from the sample defect rate, (7) the sample defect rate is used to calculate a new value of n, (8) steps (2)-(7) are repeated until a suitable n is determined and sampling is completed, wherein the sample defect rate)(0°)found at iteration i is used as the defect rate for computing n at iteration i+1, wherein a suitable n is determined and sample is completed if n at iteration i+1 is less than n at iteration i; and terminating the certification process and certifying the widget template if the sample defect rate is within the acceptable defect rate;

input parameter schema, wherein the parameter schema is associated with the widget template;

store an alternative set of parameter values;

validate the alternative parameter values against the parameter schema and replace at least one default parameter value with at least one new parameter value without recompiling source code; and make the instantiated widget available for use.

13. The system of claim 12, wherein the one or more computer processors are configured to make the instantiated widget available for use by sending the instantiated widget over a network to a set-top box.

* * * * *